(12) United States Patent
Fujiwara

(10) Patent No.: US 11,090,752 B2
(45) Date of Patent: Aug. 17, 2021

(54) PULSED ARC WELDING CONTROL METHOD AND PULSED ARC WELDING DEVICE

(71) Applicant: Panasonic Intellectual Property Management Co., Ltd., Osaka (JP)

(72) Inventor: Junji Fujiwara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 15/781,165

(22) PCT Filed: Jan. 23, 2017

(86) PCT No.: PCT/JP2017/002091
§ 371 (c)(1),
(2) Date: Jun. 4, 2018

(87) PCT Pub. No.: WO2017/135080
PCT Pub. Date: Aug. 10, 2017

(65) Prior Publication Data
US 2018/0345399 A1 Dec. 6, 2018

(30) Foreign Application Priority Data

Feb. 4, 2016 (JP) .............................. JP2016-019856

(51) Int. Cl.
*B23K 9/09* (2006.01)
*B23K 9/12* (2006.01)
(52) U.S. Cl.
CPC .................. *B23K 9/09* (2013.01); *B23K 9/12* (2013.01); *B23K 9/124* (2013.01)
(58) Field of Classification Search
CPC ............. B23K 9/124; B23K 9/09; B23K 9/12
(Continued)

(56) References Cited

U.S. PATENT DOCUMENTS 3,376,473 A * 4/1968 Oku ..................... B23K 9/1006
315/291
3,622,744 A * 11/1971 Main .................... B23K 9/1056
219/130.51
(Continued)

FOREIGN PATENT DOCUMENTS

JP 55-147479 11/1980
JP 58-085473 U 6/1983
(Continued)

OTHER PUBLICATIONS

International Search Report of PCT application No. PCT/JP2017/002091 dated Feb. 28, 2017.
(Continued)

*Primary Examiner* — Eric S Stapleton
(74) *Attorney, Agent, or Firm* — Wenderoth, Lind & Ponack, L.L.P.

(57) ABSTRACT

A pulse arc welding device is controlled so as to alternately repeat a peak current period in which a welding current is a peak current and a base current period in which the welding current is a base current smaller than the peak current, feed a welding wire to an object at a feeding speed while the welding current flows through the welding wire, generate an arc between the welding wire and the object, and weld the object. So as to keep an arc length of the arc to be constant, in the base current period, the feeding speed is set to a first feeding speed and, in the peak current period, the feeding speed is set to a second feeding speed which is larger than the first feeding speed and corresponds to the first feeding speed. By this method, good welding quality with reduced spattering and suppressed undercut can be obtained.

10 Claims, 9 Drawing Sheets

(58) Field of Classification Search
USPC .................................................. 219/130.51
See application file for complete search history.

(56) References Cited

U.S. PATENT DOCUMENTS

| | | | | |
|---|---|---|---|---|
| 4,497,997 A * | 2/1985 | Bodewig | ............... | B23K 9/093 219/137 PS |
| 4,594,498 A * | 6/1986 | Ueguri | ............... | B23K 9/091 219/130.21 |
| 4,620,082 A * | 10/1986 | Graville | ............... | B23K 9/091 219/130.31 |
| 4,716,274 A * | 12/1987 | Gilliland | ............... | B23K 9/1087 219/130.21 |
| 4,785,149 A * | 11/1988 | Gilliland | ............... | B23K 9/1068 219/130.1 |
| 4,887,046 A * | 12/1989 | Gilliland | ............... | B23K 9/1068 330/252 |
| 4,910,635 A * | 3/1990 | Gilliland | ............... | B23K 9/1068 361/159 |
| RE33,330 E | 9/1990 | Ogasawara | ........... | B23K 9/0956 219/130.21 |
| 5,001,326 A * | 3/1991 | Stava | ............... | B23K 9/00 219/130.21 |
| 5,017,757 A * | 5/1991 | Kawai | ............... | B23K 9/091 219/130.51 |
| 5,025,127 A * | 6/1991 | Gilliland | ............... | B23K 9/1056 219/130.1 |
| 5,057,665 A * | 10/1991 | Gilliland | ............... | B23K 9/1068 219/130.21 |
| 5,063,282 A * | 11/1991 | Gilliland | ............... | B23K 9/1056 219/130.51 |
| 5,073,695 A * | 12/1991 | Gilliland | ............... | B23K 9/1068 219/130.31 |
| 5,136,138 A * | 8/1992 | Gilliland | ............... | B23K 9/1056 219/130.1 |
| 5,349,159 A * | 9/1994 | Mita | ............... | B23K 9/091 219/130.51 |
| 5,406,051 A * | 4/1995 | Lai | ............... | B23K 9/1056 219/130.1 |
| 5,495,091 A * | 2/1996 | Tabata | ............... | B23K 9/092 219/130.51 |
| 5,508,493 A * | 4/1996 | Ueyama | ............... | B23K 9/091 219/130.51 |
| 5,525,778 A * | 6/1996 | Matsui | ............... | B23K 9/092 219/130.51 |
| 5,824,991 A * | 10/1998 | Mita | ............... | B23K 9/092 219/130.51 |
| 5,908,670 A * | 6/1999 | Dunkerley | ............... | B05B 7/224 219/76.14 |
| 5,990,445 A * | 11/1999 | Ogasawara | ............... | B23K 9/124 219/130.5 |
| 6,003,788 A * | 12/1999 | Sedov | ............... | B05B 7/205 239/132 |
| 6,051,807 A * | 4/2000 | Ogasawara | ............... | B23K 9/095 219/130.51 |
| 6,160,241 A * | 12/2000 | Stava | ............... | B23K 9/0216 219/130.21 |
| 6,172,333 B1 * | 1/2001 | Stava | ............... | B23K 9/1735 219/130.1 |
| 6,207,928 B1 * | 3/2001 | Kawamoto | ............... | B23K 9/092 219/130.51 |
| 6,215,100 B1 * | 4/2001 | Stava | ............... | B23K 9/0286 219/130.51 |
| 6,255,618 B1 * | 7/2001 | Shintani | ............... | B23K 10/006 219/121.46 |
| 6,326,591 B1 * | 12/2001 | Hutchinson | ............... | B23K 9/091 219/130.01 |
| 6,384,376 B1 * | 5/2002 | Plottier | ............... | B23K 9/09 219/130.51 |
| 6,501,049 B2 * | 12/2002 | Stava | ............... | B23K 9/09 219/130.21 |
| 6,515,259 B1 * | 2/2003 | Hsu | ............... | B23K 9/092 219/130.31 |
| 6,555,779 B1 * | 4/2003 | Obana | ............... | B23K 9/0061 219/121.63 |
| 6,600,135 B2 * | 7/2003 | Tong | ............... | B23K 9/09 219/130.51 |
| 7,067,767 B2 * | 6/2006 | Hsu | ............... | B23K 9/092 219/130.21 |
| 7,235,760 B2 * | 6/2007 | Tong | ............... | B23K 9/092 219/130.51 |
| 7,271,365 B2 * | 9/2007 | Stava | ............... | B23K 9/093 219/130.33 |
| 8,101,886 B2 * | 1/2012 | Nakahara | ............... | B23K 9/091 219/137 PS |
| 8,274,012 B2 * | 9/2012 | Yamazaki | ............... | B23K 9/173 219/130.51 |
| 8,338,750 B2 * | 12/2012 | Shiozaki | ............... | B23K 9/09 219/130.51 |
| 8,592,720 B2 * | 11/2013 | Nishisaka | ............... | B23K 9/092 219/130.1 |
| 8,664,568 B2 * | 3/2014 | Fujiwara | ............... | B23K 9/1037 219/137 R |
| 8,816,250 B2 * | 8/2014 | Koshiishi | ............... | B23K 9/173 219/130.51 |
| 9,272,356 B2 * | 3/2016 | Era | ............... | B23K 9/133 |
| 10,179,369 B2 * | 1/2019 | Henry | ............... | B23K 9/091 |
| 10,500,667 B2 * | 12/2019 | Fujiwara | ............... | B23K 9/1012 |
| 2002/0030043 A1 * | 3/2002 | Tong | ............... | B23K 9/125 219/137 PS |
| 2005/0056630 A1 * | 3/2005 | Tong | ............... | B23K 9/093 219/130.51 |
| 2007/0210048 A1 * | 9/2007 | Koshiishi | ............... | B23K 9/095 219/130.51 |
| 2008/0237196 A1 * | 10/2008 | Yamazaki | ............... | B23K 9/092 219/74 |
| 2008/0237208 A1 * | 10/2008 | Era | ............... | B23K 9/124 219/137.71 |
| 2009/0152252 A1 * | 6/2009 | Kawamoto | ............... | B23K 9/092 219/130.51 |
| 2010/0200553 A1 * | 8/2010 | Yamazaki | ............... | B23K 9/173 219/130.51 |
| 2011/0108527 A1 * | 5/2011 | Peters | ............... | B23K 9/173 219/73.2 |
| 2011/0174784 A1 * | 7/2011 | Kamei | ............... | B23K 1/14 219/74 |
| 2011/0278273 A1 * | 11/2011 | Hirota | ............... | B23K 9/0735 219/130.32 |
| 2012/0074112 A1 * | 3/2012 | Kotera | ............... | B23K 9/125 219/124.1 |
| 2012/0199560 A1 * | 8/2012 | Era | ............... | B23K 9/09 219/74 |
| 2014/0305920 A1 * | 10/2014 | Wakisaka | ............... | B23K 9/167 219/129 |
| 2015/0090703 A1 * | 4/2015 | Peters | ............... | B23K 26/32 219/130.21 |
| 2015/0151375 A1 * | 6/2015 | Peters | ............... | B23K 9/0953 219/130.21 |
| 2015/0158105 A1 * | 6/2015 | Peters | ............... | B23K 9/0671 219/130.31 |
| 2015/0158106 A1 * | 6/2015 | Peters | ............... | B23K 9/173 219/130.32 |
| 2015/0158108 A1 * | 6/2015 | Peters | ............... | B23K 9/042 219/130.1 |
| 2015/0183044 A1 * | 7/2015 | Peters | ............... | B23K 26/1423 219/130.32 |
| 2015/0183045 A1 * | 7/2015 | Peters | ............... | B23K 9/124 219/130.32 |

FOREIGN PATENT DOCUMENTS

| | | |
|---|---|---|
| JP | 6-142927 | 5/1994 |
| JP | 3033368 | 4/2000 |
| JP | 2006-312186 | 11/2006 |
| JP | 2006-334601 | 12/2006 |
| JP | 2011-050967 | 3/2011 |

(56) References Cited

FOREIGN PATENT DOCUMENTS

| | | |
|---|---|---|
| JP | 2014-073521 | 4/2014 |
| JP | 2015-030017 | 2/2015 |

OTHER PUBLICATIONS

Extended European Search Report dated Feb. 15, 2019 for the related European Patent Application No. 17747239.6.

\* cited by examiner

PULSED ARC WELDING CONTROL METHOD AND PULSED ARC WELDING DEVICE

This application is a U.S. national stage application of the PCT international application No. PCT/JP2017/002091 filed on Jan. 23, 2017, which claims the benefit of foreign priority of Japanese patent application No. 2016-019856 filed on Feb. 4, 2016, the contents all of which are incorporated herein by reference.

TECHNICAL FIELD

The present invention relates to a pulse arc welding control method and a pulse arc welding device performing pulse arc welding while feeding a welding wire, a consumable electrode.

BACKGROUND ART

In a conventional pulse arc welding, in a case of high-speed welding by a mild steel pulse MAG welding, so as to suppress the undercut which remains as grooves because an object is excavated and the excavated portion is not sufficiently filled with molten metal, it is a common construction pattern to lower a welding voltage, to shorten an arc length, and to perform welding while performing a short-circuit transfer the molten droplet. However, at the time of a short-circuit, a short-circuit current increases from the start of the short-circuit until a short-circuit is opened at a predetermined inclination. Accordingly, there is a case where the short-circuit current reaches a high value from 200 to 300 A when the short-circuit is opened and spattering is generated when the short-circuit is opened.

A pulse arc welding method is known in which the short-circuit current is sharply reduced to a low value when a constriction (neck) is detected immediately before short-circuit opening in a process of rising the short-circuit current until the short-circuit is opened at a predetermined inclination from the start of short-circuit at the time of short-circuit, so as to suppress the generation of the spattering (see, for example, PTL1). FIG. 9 illustrates a waveform of welding current I at the time of generation of a short-circuit in the pulse arc welding of the related art. In this method, a constriction (neck) control is performed to sharply reduce welding current I.

In a case where a short-circuit is generated during pulse welding, so as to open this short-circuit, a current with an inclination smaller than the inclination at the rising of the pulse current is applied, and when the short-circuit generated by this current application is released, the constriction is detected and welding current is sharply reduced. Therefore, the influence of the welding current relating to the generation of spattering when the short-circuit is opened can be reduced, and as a result, the amount of spatter generated when the short-circuit is opened can be reduced.

CITATION LIST

Patent Literature

PTL 1: Japanese Patent Laid-Open Publication No. 2006-334601

SUMMARY

A pulse arc welding device is controlled so as to weld the object by generating an arc between the welding wire and the object by causing a welding current to flow through the welding wire while feeding the welding wire to the object at a feeding speed such that the welding current alternately repeats a peak current period in which the welding current is a peak current and a base current period in which the welding current is a base current smaller than the peak current. The feeding speed is controlled so as to keep an arc length of the arc to be constant by setting the feeding speed to a first feeding speed in the base current period, and by setting the feeding speed to a second feeding speed in the peak current period, the second feeding speed being larger than the first feeding speed and corresponding to the first feeding speed.

This method provides preferable welding quality with reduced spattering and suppressed undercut.

DETAILED DESCRIPTION OF PREFERRED EMBODIMENTS

Exemplary Embodiment 1

Figure 1:
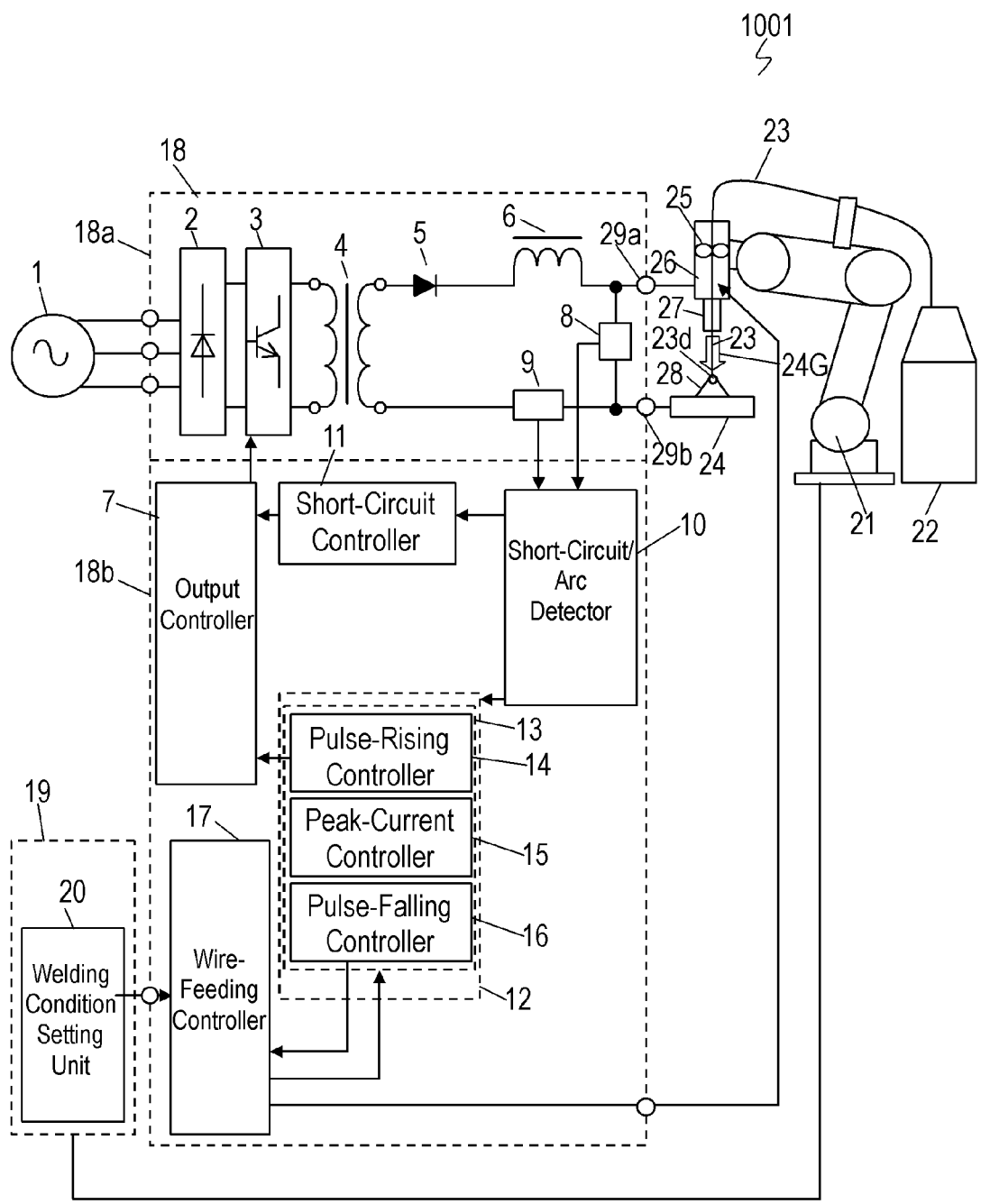
FIG. 1 is a schematic diagram of a pulse arc welding device according to Exemplary Embodiment 1.

FIG. 1 is a schematic diagram of pulse arc welding device 1001 according to Exemplary Embodiment 1. Pulse arc welding device 1001 mainly includes welding power supply device 18 which is called a welding machine, and robot 21 which is called a manipulator.

Welding power supply device 18 includes welding power supply unit 18a that outputs a welding output including welding current I and welding voltage V, and welding controller 18b that controls welding power supply unit 18a. Welding power supply device 18 includes primary rectifier 2 which rectifies an output of input power supply 1, switching element 3 which controls the welding output by controlling the output of primary rectifier 2, transformer 4 which insulates and converts electric power from switching element 3, secondary rectifier 5 which rectifies a secondary side output of transformer 4, reactor 6 (also referred to as DCL) which is connected in series to secondary rectifier 5, and output controller 7 which drives switch element 3. Welding power supply device 18 includes welding voltage detector 8 which detects welding voltage V, welding current detector 9 which detects welding current I, short-circuit/arc detector 10 which determines whether or not the welding state is a short-circuit state or an arc state based on an output of welding voltage detector 8 and/or an output of welding current detector 9, short-circuit controller 11 which controls output controller 7 during a short-circuit period, and arc controller 12 which controls output controller 7 during an arc period. Welding power supply device 18 further includes wire-feeding controller 17, output terminal 29a, and output terminal 29b.

Arc controller 12 includes pulse waveform controller 13 including pulse-rising controller 14, peak-current controller 15, and pulse-falling controller 16.

Robot controller 19 that controls operation of robot 21 includes welding condition setting unit 20 which sets welding conditions. Robot controller 19 is connected so as to be capable of communicating with welding power supply device 18. Torch 26 is attached to robot 21.

Welding condition setting unit 20 which is provided in robot controller 19 connected to welding power supply device 18 is for setting, e.g. a welding current and a welding voltage. Output terminal 29a of welding power supply device 18 is electrically connected to chip 27 holding welding wire 23 passing through in torch 26, and supplies an electric power to welding wire 23 via chip 27. Output terminal 29b of welding power supply device 18 is electrically connected to object 24 and supplies an electric power to object 24. Arc 28 is generated between a tip portion of welding wire 23 and object 24. Wire feeder 25 including a feeding roller feeds welding wire 23 toward object 24 at feeding speed WF from welding wire storage unit 22 storing welding wire 23 toward chip 27. Each of constituent portions constituting pulse arc welding device 1001 illustrated in FIG. 1 may be configured to respectively alone or may be configured by combining plural constituent portions.

Figure 2:
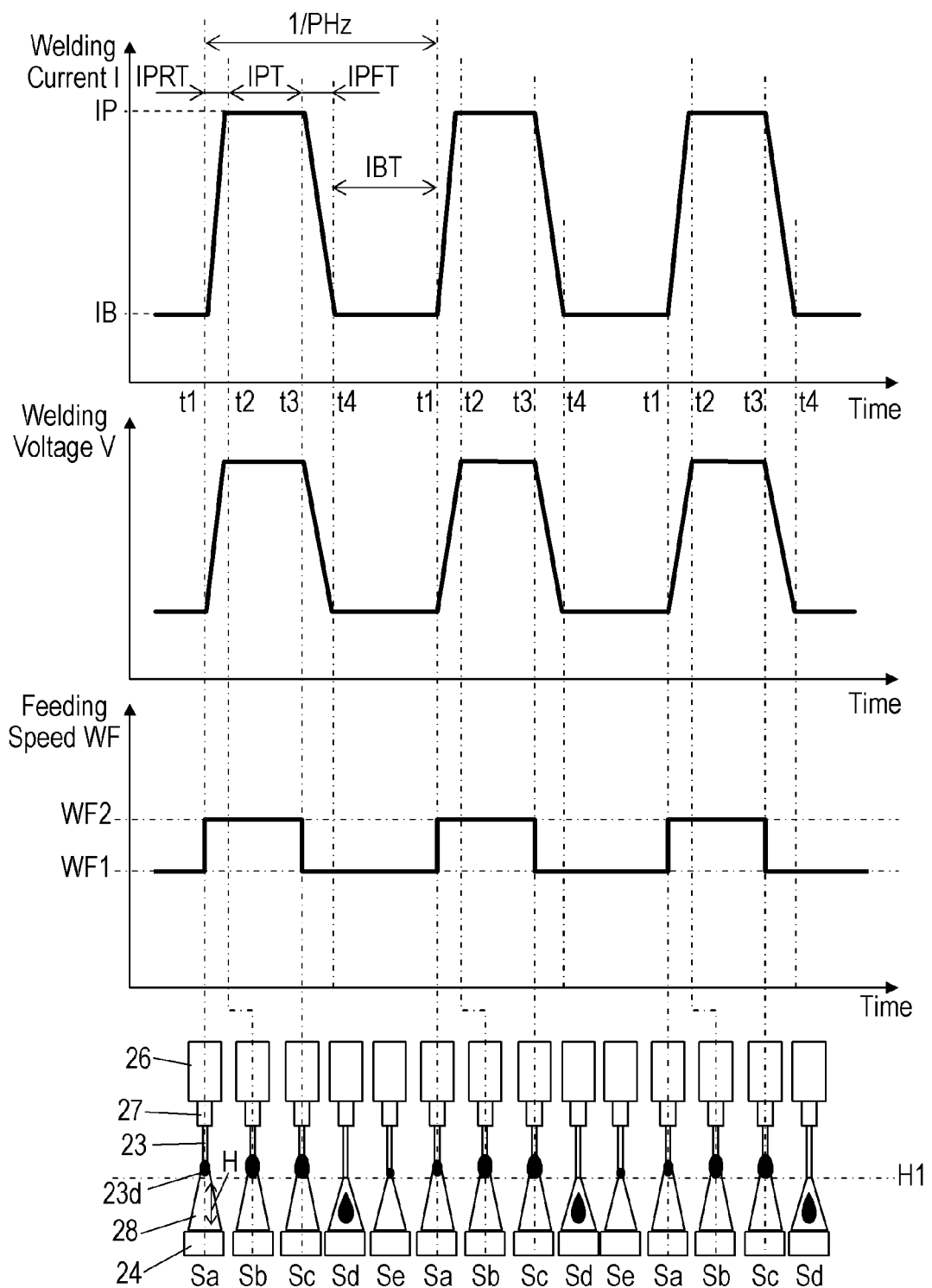
FIG. 2 illustrates a welding current, a welding voltage, a feeding speed of a welding wire, and a state of molten droplet transfer in operation of the pulse arc welding device according to Embodiment 1.

FIG. 2 illustrates welding current I, welding voltage V, feeding speed WF, and a state of molten droplet transfer of pulse arc welding device 1001. Welding power supply device 18 supplies welding voltage V and welding current I to welding wire 23 to generate arc 28 between welding wire 23 and object 24 and melts welding wire 23 to form molten droplet 23d at a tip of welding wire 23. Molten droplet 23d moves and adheres to object 24 from the tip of welding wire 23 to weld object 24. Pulse arc welding device 1001 is configured to cause arc length H of arc 28 to be constant and short enough not to short-circuit welding wire 23 and object 24 in a molten droplet transfer (removal) state. In a case where molten droplet 23d is formed at the tip of welding wire 23 and is connected to welding wire 23, arc 28 is generated between molten droplet 23d formed at the tip of welding wire 23 and object 24. Therefore, in a case where molten droplet 23d is formed at the tip of welding wire 23 and is connected to welding wire 23, arc length H of arc 28 is substantially equal to a distance between object 24 and molten droplet 23d formed at the tip of welding wire 23. In a case where molten droplet 23d is not formed at the tip of welding wire 23 or molten droplet 23d is not connected to the tip of welding wire 23, arc 28 is generated between object 24 and the tip of welding wire 23. In other words, in a case where molten droplet 23d is not formed at the tip of welding wire 23 or molten droplet 23d is not connected to the tip of welding wire 23, arc length H of arc 28 is substantially equal to a distance between object 24 and the tip of welding wire 23. Welding current I illustrated in FIG. 2 alternately repeats peak current period IPT in which welding current I is peak current IP and base current period IBT in which welding current I is base current IB smaller than peak current IP.

In welding current I, welding voltage V, a state of molten droplet transfer, and feeding speed WF of pulse arc welding device 1001 illustrated in FIG. 2, feeding speed WF increases in peak current period IPT during which molten droplet 23d grows. A stable molten droplet transfer (removal) state in base current period IBT. This operation suppresses the change of arc length H and allows arc length H to constant value H1.

Figure 3:
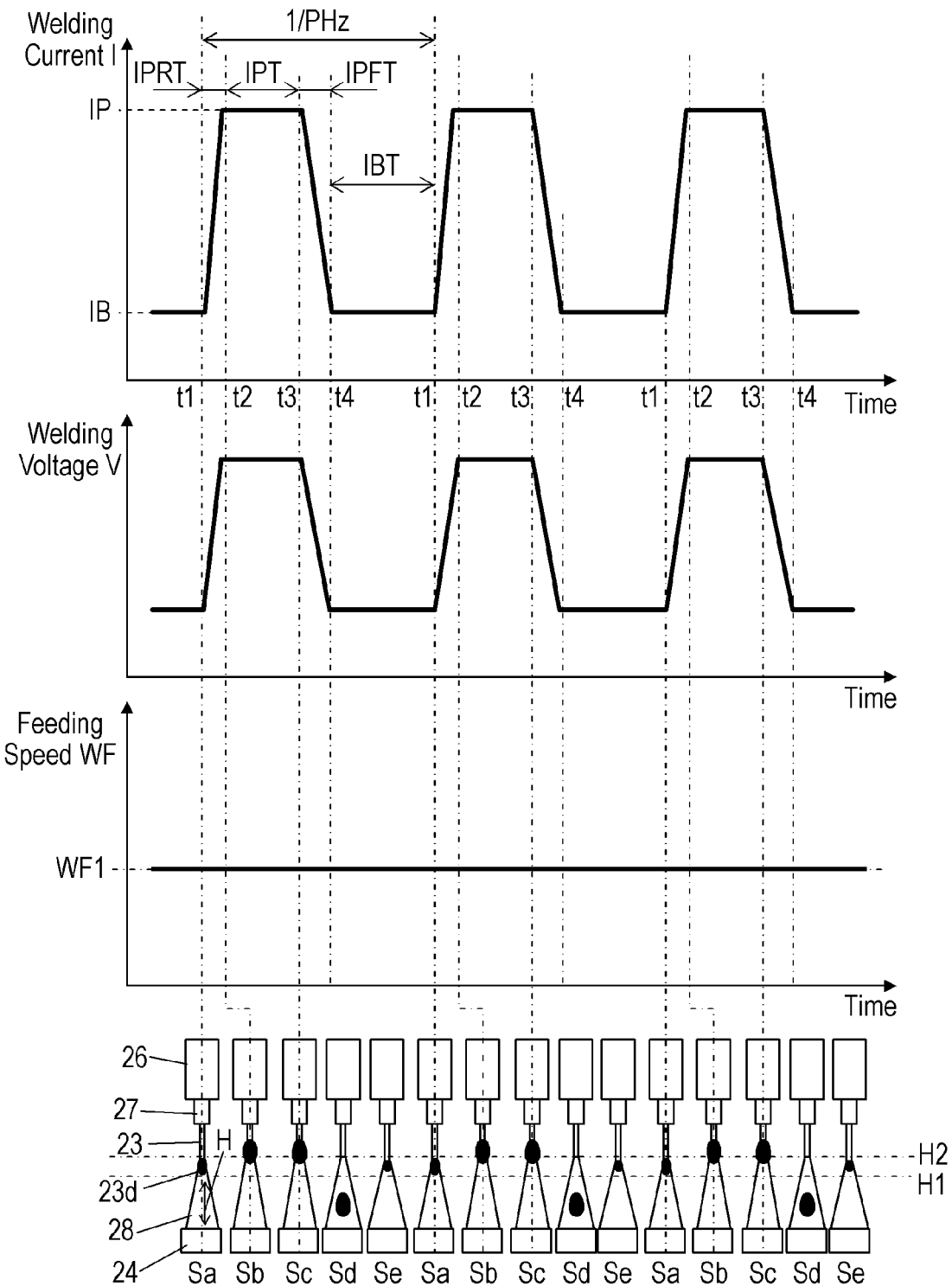
FIG. 3 illustrates a welding current, a welding voltage, a feeding speed, and a state of molten droplet transfer in operation of a comparative example of a pulse arc welding device.

FIG. 3 illustrates welding current I, welding voltage V, a state of a molten droplet transfer state, and feeding speed WF of a comparative example of a pulse arc welding device. In the comparative example of the pulse arc welding device, feeding speed WF of welding wire 23 is constant and the molten droplet transfer (removal) is performed in base current period IBT. Accordingly, arc length H changes within a range from value H1 to value H2.

The pulse waveform of welding current I illustrated in FIG. 3 is a basic pulse waveform realizing a stable molten droplet transfer (removal) periodically repeated in a steady welding period. The pulse waveform of welding current I includes pulse-rising period IPRT in which welding current I changes from base current IB to peak current IP, peak current period IPT in which welding current I is peak current IP, pulse-falling period IPFT in which welding current I changes from peak current IP to base current IB, and base current period IBT in which welding current I is base current IB. Such a periodic repeating of pulse-rising period IPRT, peak current period IPT, pulse-falling period IPFT, and base current period IBT at pulse frequency PHz provides a periodic molten droplet transfer state.

In the molten droplet transfer illustrated in FIGS. 2 and 3, welding controller 18b adjusts pulse waveform parameters, such as peak current IP, base current IB, pulse-rising period IPRT, peak current period IPT, pulse-falling period IPFT, and pulse current period IBT, which determine a pulse waveform so as to realize one pulse one drop in which molten droplet 23d is removed once per one pulse. The pulse waveform parameters changes according to, e.g. the welding condition of object 24 and welding wire 23, and can be previously obtained by, e.g. a construction confirmation, such as an experiment.

Welding current I, welding voltage V, a state of molten droplet transfer and feeding speed WF of the comparative example of the pulse arc welding device illustrated in FIG. 3 will be detailed below. The welding controller of the comparative example of the pulse arc welding device starts to change welding current I from base current IB toward peak current IP at time point t1 at which pulse-rising period IPRT starts. Then, welding current I reaches peak current IP to start peak current period IPT at time point t2 at which pulse-rising period IPRT ends. The welding controller maintains welding current I substantially at peak current IP continuously in peak current period IPT. After that, the welding controller starts to decrease welding current I from peak current IP at time point t3 at which peak current period IPT ends and pulse-falling period IPFT starts. Then, welding current I reaches base current IB smaller than peak current IP to start base current period IBT at time point t4 at which pulse-falling period IPFT ends. The welding controller maintains welding current I substantially at base current IB continuously in base current period IBT. The welding controller starts to change welding current I from base current IB toward peak current IP at time point t1 when base current period IBT ends and pulse-rising period IPRT starts. The welding controller thus repeats pulse-rising period IPRT, peak current period IPT, pulse-falling period IPFT, and base current IB at pulse frequency PHz (pulse cycle (1/PHz)). In pulse-rising period IPRT in which welding current I changes from base current IB to peak current IP, molten droplet 23d starts to grow (state Sa). Then, in peak current period IPT in which welding current I is peak current IP, molten droplet 23d grows to have an optimal size (state Sb). After that, in pulse-falling period IPFT in which welding current I changes from peak current IP to base current IB, molten droplet 23d becomes a constriction state (state Sc) forming a constriction which is a portion having a locally small diameter between molten droplet 23d connected to welding wire 23 and welding wire 23 immediately before molten droplet 23d is removed from welding wire 23 at the tip of welding wire 23 and having a locally small diameter. After that, in base current period IBT in which welding current I is base current IB, molten droplet 23d is removed from welding wire 23 (state Sd). In base current period IBT, after molten droplet 23d is removed (state Sd), molten droplet 23d slightly grows to have an increasing size due to a residual heat at the tip of welding wire 23.

In the comparative example of the pulse arc welding device illustrated in FIG. 3, feeding speed WF of welding wire 23 is constant feeding speed WF1 corresponding to the set current of welding current I.

This molten droplet transfer (removal) state is repeated at pulse frequency PHz to provide a stable welding state and a bead with less spattering and a preferably appearance.

In the comparative example of the pulse arc welding device illustrated in FIG. 3, arc length H changes in a range between different values H1 and H2 in peak current period IPT and base current period IBT. In peak current period IPT, large peak current IP flows in welding wire 23, the melting speed at which welding wire 23 melts larger than feeding speed WF1 increases, and molten droplet 23d is formed, so that arc length H becomes long (Value H2). In base current period IBT, small base current IB is applied to welding wire 23, the melting speed of welding wire 23 becomes smaller than feeding speed WF1, and arc length H becomes short (value H1).

Thus, in one cycle of the pulse waveform, arc length H changes to value H1 and value H2, and the change is repeated at pulse frequency PHz. Molten droplet 23d forms a molten pool on object 24 until molten droplet 23d moves onto object 24 and solidifies. The molten pool is made of a molten metal containing a melted portion of object 24. In peak current period IPT, as arc length H temporarily increases to value H2, the molten pool becomes large. The molten pool solidifies to form a bead on object 24. The molten metal to become a bead starts to solidify from the edge of the low-temperature bead and the bead center of the high temperature finally solidifies as the final solidification point. In a case of moving object 24 relatively to torch 26 in the moving direction, the bead is formed to be elongated in the moving direction and the final solidification point is the center of the bead in the width direction perpendicular to the moving direction. Therefore, the molten metal at the time of forming the bead solidifies so as to be pulled at the final solidification point. Therefore, as the distance between the bead edge of the low temperature and the bead center of the high-temperature increases, that is, as the molten pool increases, the amount of molten metal at the edge of the bead is likely to be insufficient and undercut is likely to be generated.

In the comparative example of the pulse arc welding device, the undercut can be suppressed by decreasing welding voltage V, decreasing arc length H, and reducing the molten pool. However, by molten droplet 23d becoming the short-circuit transfer from a spray transfer due to a decrease in welding voltage V, the spattering due to the short-circuit between welding wire 23 and object 24 may increase.

In the operation illustrated in FIG. 2 in pulse arc welding device 1001 according to Embodiment 1, object 24 can be welded while keeping short arc length H to be constant so that the size of the weld pool decreases and short-circuit is not generated also at the time of the high-speed welding. This operation will be described below. Short arc length H which is not short-circuited ranges, for example, from about 2 mm to about 3 mm.

In the pulse waveform of welding current I illustrated in FIG. 2, similarly to the pulse waveform illustrated in FIG. 3, molten droplet 23d starts to grow in a pulse-rising period IPRT in which welding current I changes from base current IB to peak current IP (state Sa). After that, molten droplet 23d grows to have an optimum size in peak current period IPT in which welding current I is peak current IP (state Sb). After that, in a pulse-falling period IPFT in which welding current I changes from peak current IP to base current IB, a constriction state (State Sc) in which a constriction is formed immediately before molten droplet 23d is removed from welding wire 23 at the tip of welding wire 23 is generated. After that, molten droplet 23d is removed from welding wire 23 in base current period IBT in which welding current I is base current IB (state Sd).

The operation illustrated in FIG. 2 is different from the operation of the comparative example illustrated in FIG. 3 in feeding speed WF at which welding wire 23 is fed. Welding controller 18b sets feeding speed WF to feeding speed WF1. Welding controller 18b starts to increase feeding speed WF toward feeding speed WF2 larger than feeding speed WF1 at time point t1 at which pulse-rising period IPRT starts so as to have the feeding speed WF reach feeding speed WF2. In the operation illustrated in FIG. 2, feeding speed WF reaches feeding speed WF2 immediately after starting to increase from feeding speed WF1 at time point t1. After that, welding controller 18b starts to decrease feeding speed WF from feeding speed WF2 in peak current period IPT toward feeding speed WF1 in base current period IBT at the time point t3 when pulse-falling period IPFT starts so as to have feeding speed WF reach feeding speed WF1. In the operation illustrated in FIG. 2, feeding speed WF reaches feeding speed WF1 immediately after starting to decrease from feeding speed WF2 at time point t3.

Welding controller 18b provides a molten droplet transfer (removal) state while periodically changing feeding speed WF between feeding speeds WF1 and WF2 at pulse frequency PHz according to the pulse waveform of welding current I. This operation provides stable welding state while keeping the short arc length H to be constant, and provides a bead having no undercut and less spattering and a preferable appearance.

Figure 4:
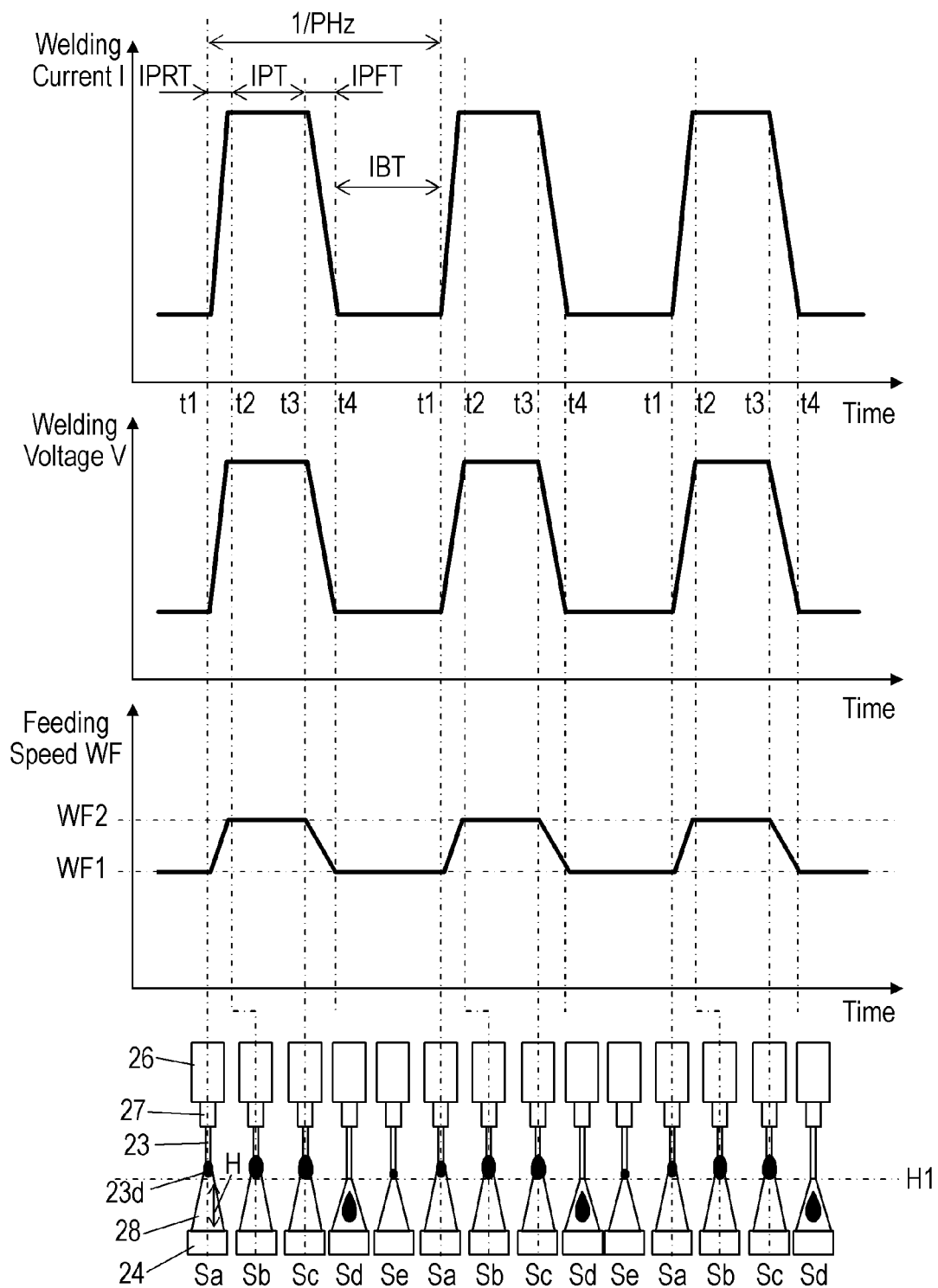
FIG. 4 illustrates a welding current, a welding voltage, a feeding speed, and a state of molten droplet transfer in another operation of the other pulse arc welding device according to Embodiment 1.

FIG. 4 illustrates welding current I, welding voltage V, feeding speed WF and a state of molten droplet transfer in another operation of pulse arc welding device 1001 for keeping arc length H to be constant. In FIG. 4, items identical to those of the operation illustrated in FIG. 2 are denoted by the same reference numerals. In the operation illustrated in FIG. 4, welding controller 18b starts to increase feeding speed WF of welding wire 23 at a predetermined inclination from feeding speed WF1 toward feeding speed WF2 at time point t1 at which pulse-rising period IPRT starts. After the time point t1, welding controller 18b maintains feeding speed WF to feeding speed WF2 after having feeding speed WF reach feeding speed WF2. After that, welding controller 18b starts to decrease feeding speed WF from feeding speed WF2 toward feeding speed WF1 at a predetermined inclination at time point t3 at which peak current period IPT ends and pulse-falling period IPFT starts. After time point t3, welding controller 18b maintains feeding speed WF to feeding speed WF1 after having feeding speed WF reach feeding speed WF1 at time point t4.

As illustrated in FIG. 4, welding controller 18b starts to increase feeding speed WF at a predetermined inclination from feeding speed WF1 toward feeding speed WF2 at time point t1, and preferably to maintain feeding speed WF at feeding speed WF2 after having feeding speed WF reach feeding speed WF2 at time point t2. In other words, the predetermined inclination at which feeding speed WF increases from feeding speed WF1 to feeding speed WF2 is adjusted preferably to allow a period in which feeding speed WF increases from feeding speed WF1 to feeding speed WF2 to be identical to pulse-rising period IPRT. Further, welding controller 18b preferably starts to decrease feeding speed WF from feeding speed WF2 to feeding speed WF1 at a predetermined inclination at time point t3, and maintains the feeding speed to feeding speed WF1 after having feeding speed WF reach feeding speed WF1 at time point t4. In other words, the predetermined inclination at which feeding speed WF decreases from feeding speed WF2 to feeding speed WF1 is adjusted to allow a period in which feeding speed WF decreases from feeding speed WF2 to feeding speed WF1 to be identical to pulse-falling period IPFT.

Figure 5:
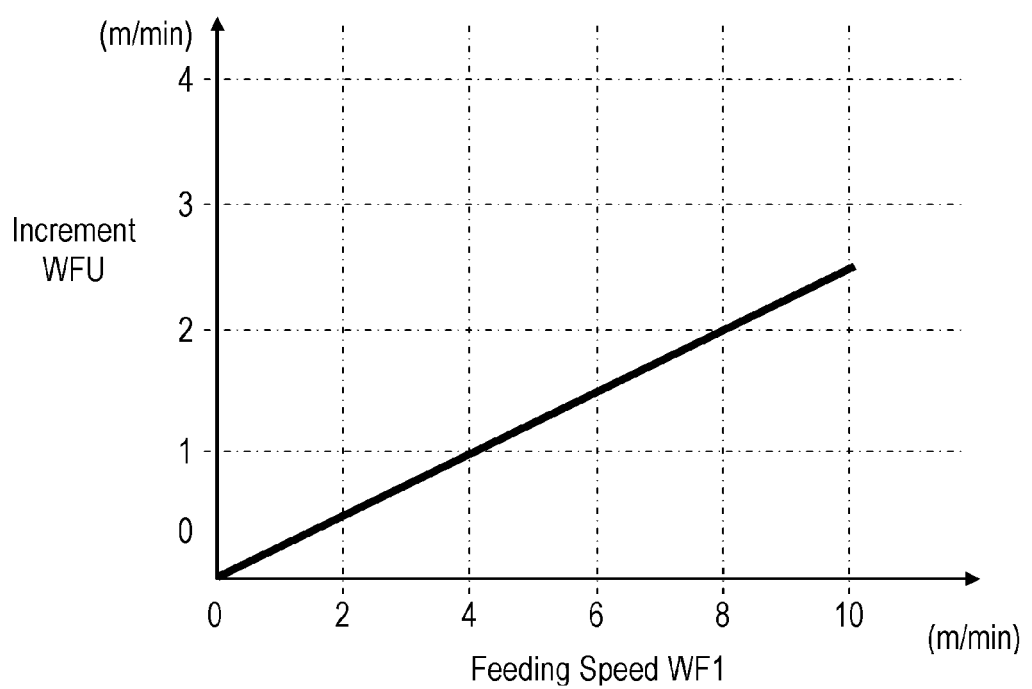
FIG. 5 illustrates the feeding speed of the welding wire of the pulse arc welding device according to Embodiment 1.

FIG. 5 illustrates feeding speed WF2 of feeding speed WF. In detail, FIG. 5 illustrates a relationship (WF2=WF1+WFU) between feeding speed WF1 and increment WFU which is a difference obtained by subtracting feeding speed WF1 from feeding speed WF2 for pulse MAG welding in which welding wire 23 is made of a mild steel having a diameter of $\phi 1.2$ employing shielding gas 24G (see FIG. 1) composed of mixture of Ar gas and CO2 gas (Ar:$CO_2$=80:20).

In FIG. 5, the horizontal axis represents feeding speed WF1, and the vertical axis represents increment WFU with respect to feeding speed WF1 to feeding speed WF2. For example, in a case where feeding speed WF1 is 4 m/min, increment WFU is 1 m/min. In a case where feeding speed WF1 is 8 m/min, increment WFU is 2 m/min. In the relationship illustrated in FIG. 5, an increase rate of feeding speed WF2 to feeding speed WF1, that is, the ratio of the increment WFU to feeding speed WF1 is about 25%. As feeding speed WF increases, the welding current I increases so that molten droplet 23d becomes larger. Therefore, when feeding speed WF1 increases, the increment WFU increases although the increasing rate of feeding speed WF2 is constant.

The proper increment WFU (increase rate) of feeding speed WF changes due to the welding conditions, such as the diameter of welding wire 23 and the material, shielding gas 24G, and can be previously obtained by a construction confirmation of an experiment, for example.

For example, as an example in which the material is different, in a case where the material of welding wire 23 is stainless steel, the viscosity of the stainless steel is high and molten droplet 23d is unlikely to be separated so that molten droplet 23d tends to be larger than a mild steel. Therefore, in a case where the material of welding wire 23 is stainless steel, the increment WFU from feeding speed WF1 to feeding speed WF2 is larger than that a case of a mild steel illustrated in FIG. 5.

As an example in which shielding gas 24G is different, in a case of MAG welding employing shielding gas 24G having a large Ar gas ratio (Ar:$CO_2$=90:10), molten droplet 23d is easily removed and tends to be smaller than in a case of MAG welding (Ar:$CO_2$=80:20). Therefore, the increment WFU at MAG welding (Ar:$CO_2$=90:10) having a large Ar gas ratio is smaller than that in a case of MAG welding (Ar:$CO_2$=80:20) illustrated in FIG. 5.

As an example where the diameter of the wire is different, if the diameter of welding wire 23 becomes larger than $\phi 1.2$, the size of molten droplet 23d accordingly tends to be larger than the diameter of $\phi 1.2$. Therefore, increment WFU for the diameter of welding wire 23 larger than $\phi 1.2$ is larger than the diameter $\phi 1.2$ illustrated in FIG. 5. Conversely, if the diameter of welding wire 23 is smaller than $\phi 1.2$, molten droplet 23d tends to be smaller than a case where the diameter of welding wire 23 is $\phi 1.2$. Therefore, in the case that the diameter of welding wire 23 is smaller than $\phi 1.2$, increment WFU is smaller than a case where the diameter of welding wire 23 illustrated in FIG. 5 is $\phi 1.2$.

Even if arc length H is short, the ratio of increment WFU to feeding speed WF1 ranges basically from 10% to 30% so that short-circuit between welding wire 23 and object 24 may not occur particularly during peak current period IPT and arc length H may be constant. The correlation between feeding speed WF1 and increment WFU may be not only a linear function illustrated in FIG. 5 but also a quadratic function, and increment WFU may be determined by a database storing discrete values of the difference between feeding speed WF1 and increment WFU.

In a usual pulse arc welding, a large current is applied during the peak current period, the arc length becomes longer due to molten droplet formation due to the earlier wire melting. Then, wire melting is slow due to the application of a low current in the base current period, so that arc length becomes shorter.

Therefore, the arc length repeats long and short during one cycle of the pulse. If the arc length is temporarily long, undercut is likely to be generated at the time of high-speed welding. Even if the arc length is shortened by lowering the voltage so as to suppress the undercut, it is inevitable that the spattering at the short-circuit transfer increases.

In order to suppress spattering, at the time of short-circuiting, the short-circuit current may be increased to a short-circuit open at a predetermined inclination from the start of the short-circuit. After that, short-circuit current may be sharply reduced to a low value by detecting the constriction immediately before opening the short-circuit. However, even with this method, spattering may not be reduced so much.

Therefore, the conventional pulse arc welding can hardly suppress undercut and reduce spattering.

As described above, in pulse arc welding device 1001 according to Embodiment 1, feeding speed WF of welding wire 23 in peak current period IPT is set to feeding speed WF2, and feeding speed WF changes to the feeding speeds WF1 and WF2 in synchronization with the switching between peak current IP and base current IB. This configuration provides pulse arc welding in which undercut is suppressed and spattering decreases of welding current I.

In pulse arc welding device 1001 according to Embodiment 1, feeding speed WF of welding wire 23 is changed according to peak current period IPT and base current period IBT. In particular, feeding speed WF is set to feeding speed WF1 in base current period IBT, and feeding speed WF is set to feeding speed WF2 larger than feeding speed WF1 and corresponds to feeding speed WF1 in peak current period IPT. Accordingly, arc length H can be short and constant, and the molten pool can be stably reduced. In addition, the temperature difference between the edge of the bead and the center of the bead becomes small in the width direction, and the molten metal is unlikely to be pulled toward the center of the bead in the width direction which is the final solidification point. Therefore, the amount of molten metal at the edge of the bead is unlikely to be insufficient, so that undercut can be suppressed. Pulse arc welding device 1001 according to Embodiment 1 can provide preferable welding quality in which undercut is suppressed particularly even at the time of high-speed welding. In addition, in pulse arc welding device 1001 according to Embodiment 1, molten droplet 23d can be in a state of spray transfer instead of a state of short-circuit transfer in peak current period IPT while suppressing undercut, so that spattering can be suppressed.

If a short-circuit is generated between welding wire 23 and object 24, welding current I becomes short-circuit current IS. In welding power supply device 18 illustrated in FIG. 1, when short-circuit controller 11 receives, from short-circuit/arc detector 10, a signal indicating that a short-circuit is generated, short-circuit controller 11 controls short-circuit current IS so that the short-circuit can be opened.

As when arc controller 12 receives, from short-circuit/arc detector 10, a signal indicating that arc 28 is generated, pulse waveform controller 13 outputting a signal of a pulse current waveform based on feeding speed WF controlled by wire-feeding controller 17 sends, to output controller 7, a pulse waveform parameter, such as peak current IP and base current IB, that determines the pulse waveform of welding current I. Feeding speed WF has a correlation with the set current or set current of welding current I set in welding condition setting unit 20 of arc controller 12. Pulse-rising controller 14 of pulse waveform controller 13 outputs a timing signal that starts to increase feeding speed WF from feeding speed WF1 toward feeding speed WF2 at the time point t1 at which pulse-rising period IPRT starts. Pulse-falling controller 16 outputs a timing signal that starts to decrease feeding speed WF from feeding speed WF2 toward feeding speed WF1 at time point t3 at which the pulse-falling IPFT starts. Pulse waveform controller 13 controls peak current IP and base current IB.

Based on the set current of welding current I set in welding condition setting unit 20 of robot controller 19, wire-feeding controller 17 of the welding power supply device 18 determines the feeding speed WF corresponding to the set current, and outputs feeding speed WF. Pulse waveform controller 13 of arc controller 12 receives feeding speed WF output from wire feed controller 17 and outputs a pulse waveform parameter, such as peak current IP, base current IB, pulse-rising period IPRT, peak current period IPT, and pulse-falling period IPFT, which determines a pulse waveform of welding current I corresponding to received feeding speed WF. Based on the signal from wire-feeding controller 17, wire feeding unit 25 including the feeding roller feeds welding wire 23.

As described above, pulse arc welding device 1001 is configured to weld an object 24 with a welding wire 23. The pulse arc welding device 1001 is controlled so as to weld the object 24 by generating an arc 28 between the welding wire 23 and the object 24 by causing a welding current I to flow through the welding wire 23 while feeding the welding wire 23 to the object 24 at a feeding speed WF such that the welding current I alternately repeats a peak current period IPT in which the welding current I is a peak current IP and a base current period IBT in which the welding current I is a base current IB smaller than the peak current IP. The feeding speed WF is controlled so as to keep an arc length H of the arc 28 to be constant. The feeding speed WF is set to a feeding speed WF1 in the base current period IBT. The feeding speed WF is set to a feeding speed WF2 in the peak current period IPT, the feeding speed WF2 being larger than the feeding speed WF1 and corresponding to the feeding speed WF1.

The feeding speed WF2 may be larger than the feeding speed WF1 by a value corresponding to at least one of a diameter and a material of the welding wire 23.

The pulse arc welding device 1001 may be controlled so as to weld the object 24 with using a shielding gas 24G. In this case, the feeding speed WF2 may be larger than the feeding speed WF1 by a value corresponding to at least one of the shielding gas 24G and a diameter and a material of the welding wire 23.

The feeding speed WF may start to decrease from the feeding speed WF2 toward the feeding speed WF1 simultaneously when the welding current I starts to fall from the peak current IP toward the base current IB while transferring from the peak current period IPT to the base current period IBT.

The feeding speed WF may be controlled such that a period in which the feeding speed WF reaches the feeding speed WF2 from the feeding speed WF1 is identical to a period in which the welding current I reaches the peak current IP from the base current IB. A period identical to a period means not only that the lengths of the periods are identical to each other, but also that the starting time point of the periods are identical to each other and the ending time points of the periods are identical to each other.

The feeding speed WF may be controlled such that a period in which the feeding speed WF reaches the feeding speed WF1 from the feeding speed WF2 is identical to a period in which the welding current I reaches the base current IB from the peak current IP.

The feeding speed WF2 may be larger than the feeding speed WF1 by a value ranging from 10% to 30% of the feeding speed WF1.

As described above, in the pulse arc welding control method and pulse arc welding device 1001 according to the present embodiment, in peak current period IPT in which arc length H is long, feeding speed WF increases to feeding speed WF2 which is larger than feeding speed WF1 and corresponds to feeding speed WF1. Accordingly, arc length H in peak current period IPT can be equal to that in base current period IBT, and decreases to generate no short-circuiting. Accordingly, molten droplet 23d is removed from welding wire 23 in the spray transfer state without entering into the short-circuit transfer state, spattering accompanying generation of a short-circuit is not generated, and almost no spattering can be generated. Accordingly, a preferable welding quality suppressing undercut even at the time of high-speed welding can be realized.

Exemplary Embodiment 2

Figure 6:
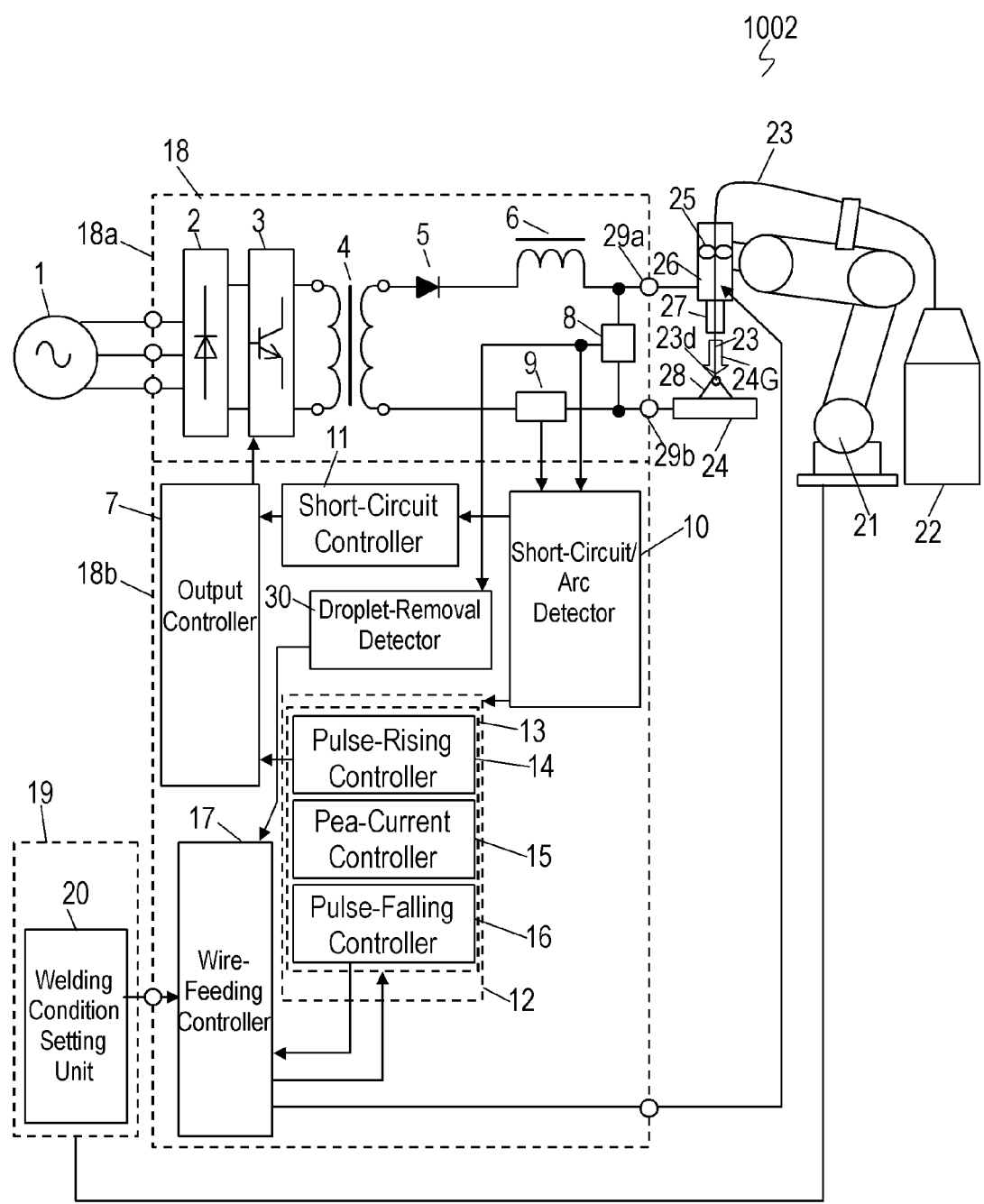
FIG. 6 is a schematic diagram of a pulse arc welding device according to Exemplary Embodiment 2.

FIG. 6 is a schematic configuration diagram of pulse arc welding device 1002 according to Exemplary Embodiment 2. In FIG. 6, components identical to those of pulse arc welding device 1001 according to Embodiment 1 illustrated in FIG. 1 are denoted by the same reference numerals. Welding controller 18b of pulse arc welding device 1002 according to Embodiment 2 includes a molten droplet removal detector 30 that detects a time point at which molten droplet 23d is removed from welding wire 23. Molten droplet removal detector 30 detects constriction 23p having a locally small diameter formed between molten droplet 23d connected to welding wire 23 and welding wire 23, thereby detecting the time point of the removal of molten droplet 23d.

Figure 7A:
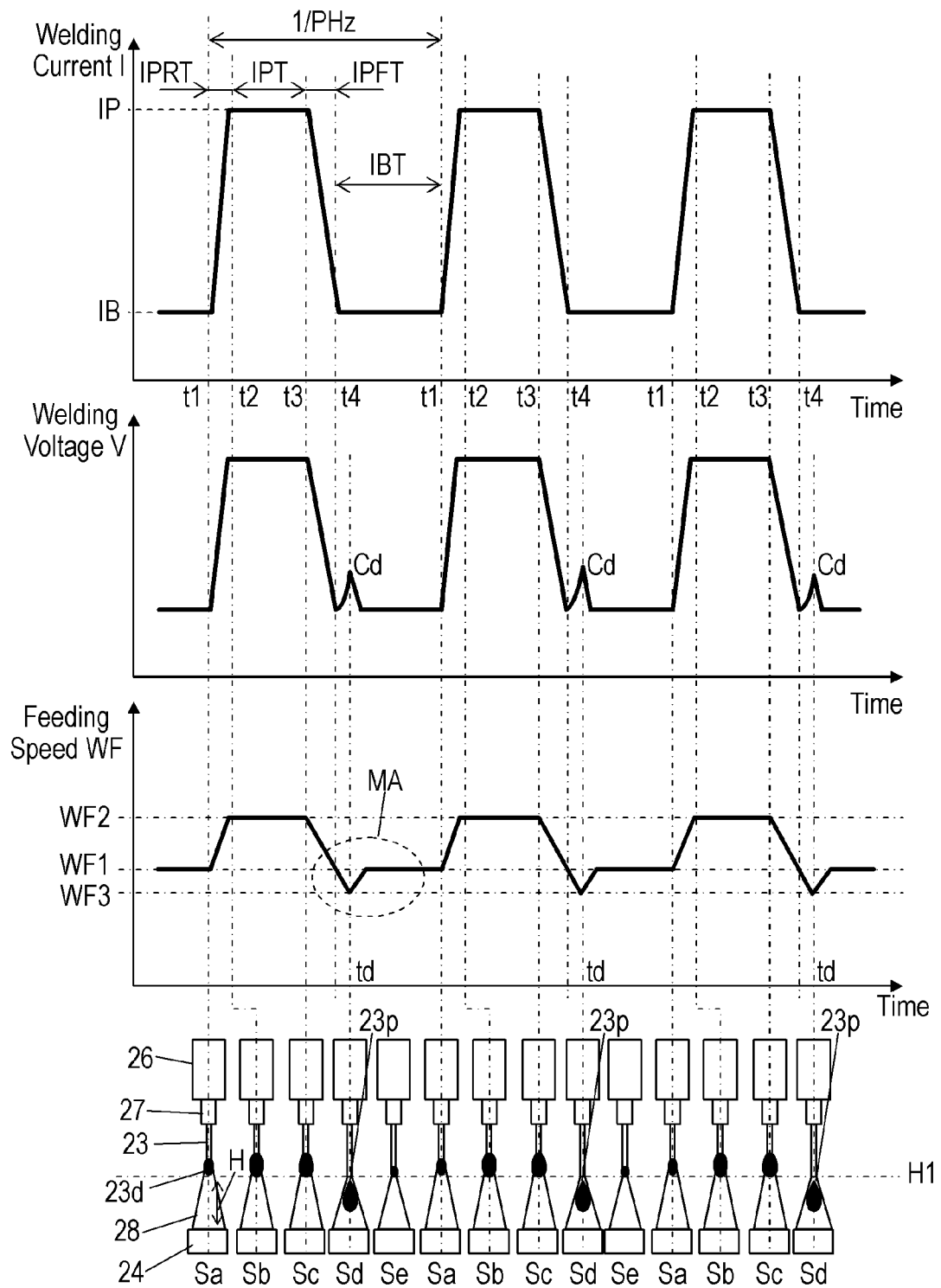
FIG. 7A illustrates a welding current, a welding voltage, a feeding speed of a welding wire, and a state of molten droplet transfer in operation of a pulse arc welding device according to Embodiment 2.

FIG. 7A illustrates welding current I, welding voltage V, feeding speed WF of welding wire 23, and a state of molten droplet transfer in the operation of pulse arc welding device 1002. In FIG. 7A, items identical to those of the operation of pulse arc welding device 1001 according to Embodiment 1 illustrated in FIGS. 4 and 5 are denoted by the same reference numerals. In pulse arc welding device 1002 according to Embodiment 2, welding controller 18b sets feeding speed WF of welding wire 23 to feeding speed WF1 in base current period IBT. Welding controller 18b sets feeding speed WF of welding wire 23 to feeding speed WF2 which is larger than feeding speed WF1 in peak current period IPT. After that, welding controller 18b starts to decrease feeding speed WF toward feeding speed WF3 which is smaller than feeding speed WF1 and have feeding speed WF reach feeding speed WF3 at time point t3 at which pulse-falling period IPFT starts. After that, welding controller 18b maintains feeding speed WF at feeding speed WF3 and keeps arc length H to be constant until detecting the removal of molten droplet 23d from welding wire 23.

Welding current I, welding voltage V, a state of molten droplet transfer, and feeding speed WF of pulse arc welding device 1002 illustrated in FIG. 7A will be detailed below. Molten droplet 23d starts to grow (state Sa) at time point t1 at which pulse-rising period IPRT in which welding current I changes from base current IB to peak current IP starts. After that, molten droplet 23d grows until molten droplet 23d has an optimum size in peak current period IPT in which welding current I is peak current IP (state Sb). After that, in pulse-falling period IPFT in which welding current I changes from peak current IP to base current IB, a constriction state in which constriction 23p is formed is provided immediately before molten droplet 23d is removed from the tip of welding wire 23 (state Sc). After that, molten droplet 23d is removed from welding wire 23 in base current period IBT in which welding current I is base current IB (state Sd).

The control of feeding speed WF for feeding welding wire 23 is a main difference between the operation illustrated in FIG. 7A and the operation according to Embodiment 1 illustrated in FIG. 4. In the operation illustrated in FIG. 7A, welding controller 18b increases feeding speed WF at a predetermined inclination from feeding speed WF1 in base current period IBT toward feeding speed WF2 at time point t1 at which base pulse period IBT ends and pulse-rising period IPRT starts so as to reach feeding speed WF2. In the operation of Embodiment 2, similarly to the operation of Embodiment 1, feeding speed WF reaches feeding speed WF2 at time point t2 at which pulse-rising period IPRT ends and peak current period IPT starts. After that, welding controller 18b starts to decrease feeding speed WF at a predetermined inclination from feeding speed WF2 of peak current period IPT toward feeding speed WF3 of base current period IBT which is smaller than feeding speed WF1 at time point t3 at which peak current period IPT ends and pulse-falling period IPFT starts, and maintains feeding speed WF3 after reaching feeding speed WF3. After that, welding controller 18b starts to increase feeding speed WF from feeding speed WF3 to feeding speed WF1 at removal time point td at which droplet removal detector 30 detects removal of molten droplet 23d from welding wire 23, and maintains at feeding speed WF1 after reaching feeding speed WF1.

Figure 7B:
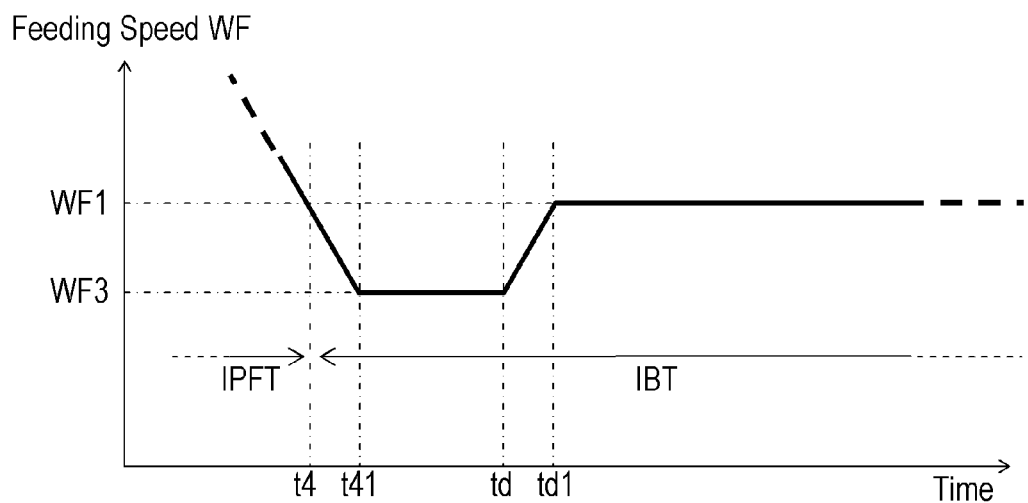
FIG. 7B is an enlarged view of the feeding speed illustrated in FIG. 7A.

The operation of pulse arc welding device 1002 according to Embodiment 2 particularly when changing from peak current period IPT to base current period IBT will be detailed below. FIG. 7B is an enlarged view of feeding speed WF of portion MA illustrated in FIG. 7A for illustrating feeding speed WF before and after removal time point td when the removal of molten droplet 23d is detected. As illustrated in FIG. 7A, welding controller 18b starts to decrease feeding speed WF at a predetermined inclination from feeding speed WF2 of peak current period IPT toward feeding speed WF3 at time point t3. Then, as illustrated in FIG. 7B, welding controller 18b maintains feeding speed WF3 after reaching feeding speed WF3. In the operation according to Embodiment 2, while feeding speed WF decreases from feeding speed WF2 to feeding speed WF3, similarly to the operation in accordance with Embodiment 1 illustrated in FIG. 4, feeding speed WF becomes feeding speed WF1 at time point t4. After that, welding controller 18b continues to further decrease feeding speed WF toward feeding speed WF3 at the same predetermined inclination, and then, have feeding speed WF reach feeding speed WF3 at the time point t41 and then, maintains feeding speed WF at feeding speed WF3. After that, welding controller 18b starts to increase feeding speed WF from feeding speed WF3 to feeding speed WF1 at removal time point td at which droplet removal detector 30 detects removal of molten droplet 23d from welding wire 23, feeding speed WF1 is maintained after reaching feeding speed WF1. After that, as illustrated in FIG. 7A, welding controller 18b maintains feeding speed WF at feeding speed WF1 until time point t1 at which base current period IBT ends.

As described above, in the pulse arc welding control method according to Embodiment 2, in addition to Embodiment 1 described above, feeding speed WF which is decreased from feeding speed WF2 which is larger than feeding speed WF1 to feeding speed WF3 which is smaller than feeding speed WF1 starts to increase to feeding speed WF1 which is smaller than feeding speed WF2 at removal time td when the removal of molten droplet 23d is detected. Immediately before molten droplet 23d is removed from the tip of welding wire 23, constriction 23p is formed between molten droplet 23d connected to welding wire 23 and welding wire 23. Molten droplet removal detector 30 of welding controller 18b according to Embodiment 2 monitors welding voltage V, determines removal time td at which molten droplet 23d is removed based on a time point at which it is detected that constriction 23p is formed.

By repeating this molten droplet transfer (removal) state illustrated in FIG. 7A at pulse frequency PHz, a stable welding state can be realized while keeping the short arc length H to be constant, and a bead having less undercut and less spattering and a preferable appearance is obtained.

Feeding speed WF3 is smaller than feeding speed WF1 by a value corresponding to at least one of welding conditions including the material of welding wire 23 and shielding gas 24G.

Figure 8:
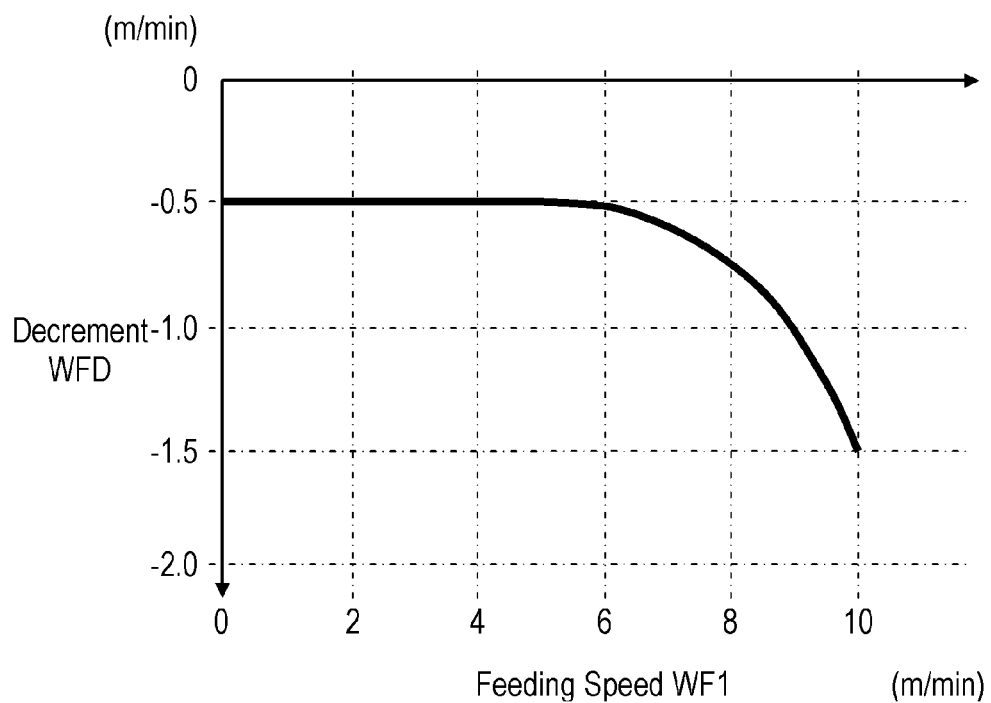
FIG. 8 illustrates the feeding speed of the welding wire of the pulse arc welding device according to Embodiment 2.
Figure 9:
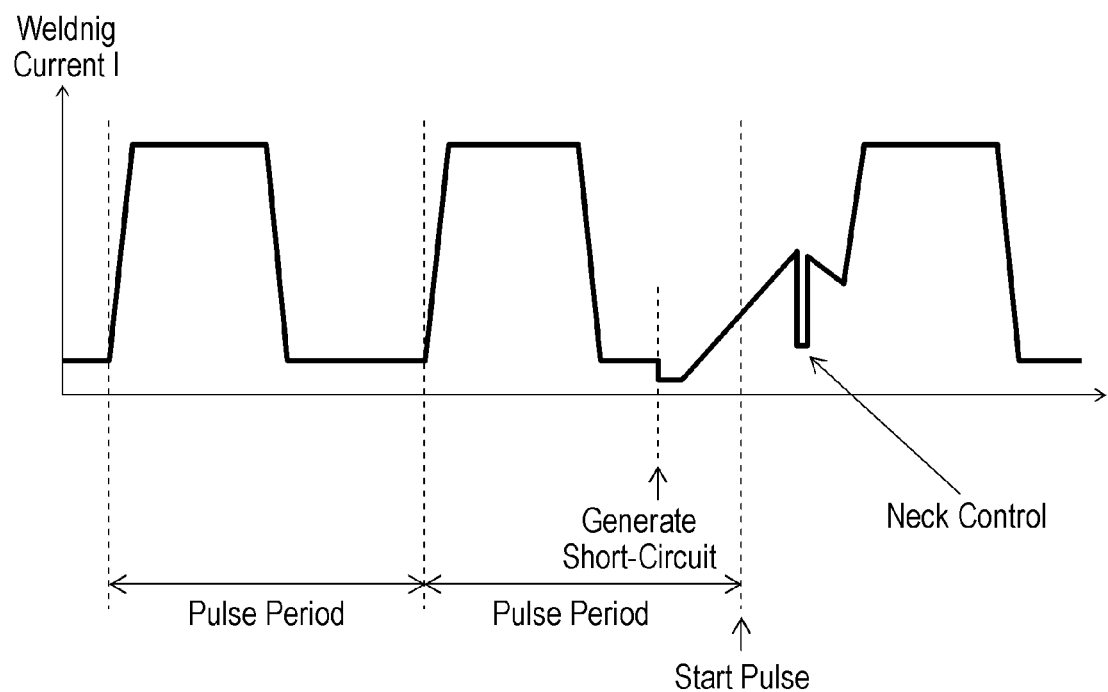
FIG. 9 illustrates the welding current of a conventional pulse arc welding.

FIG. 8 illustrates the relationship between feeding speeds WF1 and WF3. Specifically, FIG. 8 illustrates a relationship (WF1+WFD=WF3) between feeding speed WF1 and decrement WFD which is the difference obtained by subtracting feeding speed WF1 from feeding speed WF3 in pulse MAG welding with welding wire 23 is made of a mild steel having a diameter of φ1.2 and shielding gas 24G made of mixture of Ar gas and $CO_2$ gas (Ar:$CO_2$=80:20).

In FIG. 8, the horizontal axis represents feeding speed WF1, and the vertical axis represents decrement WFD. For example, in a case where feeding speed WF1 is 4 m/min, decrement WFD is −0.5 m/min. In a case where feeding speed WF1 is 8 m/min, decrement WFD is −0.75 m/min.

According to the material of welding wire 23 at molten droplet transfer (removal), constriction 23p may become large and molten droplet 23d may be elongated. Based on the relationship illustrated in FIG. 8, feeding speed WF is set to be smaller than feeding speed WF1 according to the elongation of molten droplet 23d, arc length H is kept to be constant. Since welding current I increases as feeding speed WF increases, molten droplet 23d and constriction 23p tend to become longer. Therefore, decrement WFD from feeding speed WF1 to feeding speed WF3 increases accordingly.

Appropriate decrement WFD changes depending on the wire material of welding wire 23 and the welding conditions, such as the shielding gas, and can be obtained by a construction verification, such as experiments, for example.

For example, as an example in which the material is different, in a case where the material of welding wire 23 is stainless steel, the viscosity of the stainless steel is high and molten droplet 23d is difficult to be removed, so that molten droplet 23d and constriction 23p tend to be long. Therefore, decrement WFD to feeding speed WF3 with respect to feeding speed WF1 tends to be larger than decrement WFD in a case where welding wire 23 illustrated in FIG. 8 is made of mild steel.

In addition, as an example in which shielding gas 24G is different, in a case of MAG welding employing shielding gas 24G (Ar:$CO_2$=90:10) with a large proportion of Ar gas, molten droplet 23d can be easily removed, molten droplet 23d and constriction 23p tend to be shorter than decrement WFD in the MAG welding using shielding gas 24G (Ar:$CO_2$=80:20) illustrated in FIG. 8. Therefore, the decrement WFD to feeding speed WF3 with respect to feeding speed WF1 tends to be smaller than a case of MAG welding (Ar:$CO_2$=80:20) illustrated in FIG. 8.

The relationship between feeding speed WF1 and the decrement WFD may be not only a quadratic function but also a linear function, and decrement WFD may be determined by a database that stores discrete values of feeding speed WF1 and decrement WFD.

In pulse arc welding device 1001 illustrated in FIG. 6, molten droplet removal detector 30 monitors welding voltage V detected by welding voltage detector 8 in real time, and obtains a time-differentiated value obtained by differentiating welding voltage V with time. At the time point when the time derivative value of welding voltage V exceeds a predetermined value, molten droplet removal detector 30 supplies droplet removal signal Cd to wire-feeding controller 17. Then, when the time differentiated value is equal to or less than the predetermined value, molten droplet removal detector 30 does not supply droplet removal signal Cd to wire-feeding controller 17. A time point when the time differential value of welding voltage V exceeds the predetermined value is determined as removal time point td when molten droplet 23d is removed from welding wire 23. Welding controller 18b starts to increase feeding speed WF from feeding speed WF3 toward feeding speed WF1 when welding controller 18b detects that the time differential value of welding voltage V exceeds a predetermined value indicating a state where constriction 23p of molten droplet 23d is formed from a state where feeding speed WF decreases from time point t3 at which pulse-falling period IPFT starts to increase feeding speed WF toward the feeding speed WF3.

Pulse waveform controller 13 of pulse arc welding device 1002 outputs the pulse waveform of welding current I based on the setting current set in welding condition setting unit 20 or feeding speed WF controlled by wire-feeding controller 17. Pulse-rising controller 14 of pulse waveform controller 13 transmits a signal which starts to increase feeding speed WF of welding wire 23 toward feeding speed WF2 which is larger than feeding speed WF1 in base current period IBT at time point t1 when pulse-rising period IPRT which transits from base current period IBT to peak current period IPT starts. Pulse-falling controller 16 transmits a signal which starts to decrease feeding speed WF from feeding speed WF2 toward feeding speed WF3 smaller than feeding speed WF1 at time point t3 at which pulse-falling period IPFT that transits from peak current period IPT to base current period IBT starts.

As described above, pulse arc welding device 1002 is controlled such that constriction 23p is produced between welding wire 23 and molten droplet 23d in a case where welding wire 23 is molten to form molten droplet 23d by flowing welding current I through welding wire 23. Molten droplet 23d is connected to welding wire 23. When transferring from peak current period IPT to base current period IBT, welding controller 18b decreases feeding speed WF from feeding speed WF2 to feeding speed WF3 which is smaller than feeding speed WF1 and corresponds to feeding speed WF1. Welding controller 18b increases feeding speed WF from feeding speed WF3 to feeding speed WF1 when detecting that constriction 23p is produced. Feeding speed WF may be maintained at feeding speed WF1 until the base current period IBT ends in a step of increasing feeding speed WF from feeding speed WF3 to feeding speed WF1 after feeding speed WF increases to feeding speed WF1.

Feeding speed WF3 may be smaller than feeding speed WF1 by a value corresponding to at least one of the material of welding wire 23 and shielding gas 24G.

As described above, in the pulse arc welding control method and pulse arc welding device 1002 in accordance with Embodiment 2, in peak current period IPT in which arc length H becomes longer, feeding speed WF of welding wire 23 increases to the feeding speed which is larger than feeding speed WF1 at base current period IBT. In addition to this, according to the material of welding wire 23, in a case where constriction 23p increases and molten droplet 23d is elongated at the time of the molten droplet transfer (removal), feeding speed WF decreases to feeding speed WF3 which is smaller than feeding speed WF1 by a value corresponding to the elongation thereof and feeding speed WF increases to feeding speed WF1 at removal time td at which molten droplet transfer (removal detection) is detected. As described above, welding controller 18b adjusts feeding speed WF of welding wire 23 according to the material of welding wire 23 and welding conditions, such as shielding gas 24G. Accordingly, similarly to base current period IBT including peak current period IPT, arc length H can be maintained small enough not to short-circuit, and the welding can be performed in the spray transfer state instead of the short-circuit transfer. Therefore, almost no spattering accompanying generation of a short-circuit can be generated. As described above, in pulse arc welding device 1002 according to Embodiment 2, arc length H of peak current period IPT can be small, arc length H between peak current period IPT and base current period IBT can be short and constant, and a preferable welding quality in which spattering is significantly reduced and undercut is suppressed even during high-speed welding can be realized.

INDUSTRIAL APPLICABILITY

A pulse arc welding control method according to the present invention provides a bead having an excellent appearance in which the generation of spatter can be reduced, provides a short arc length, and suppresses undercut even at high-speed welding. This method is useful to a pulse arc welding device employing a welding wire as a consumable electrode to perform arc welding while being continuously fed with the welding wire.

REFERENCE MARKS IN THE DRAWINGS

I welding current
V welding voltage
WF feeding speed
H arc length
IP peak current
IB base current
IBT base current period
IPRT pulse-rising period
IPT peak current period
IPFT pulse-falling period
PHz pulse frequency
WF1 feeding speed (first feeding speed)
WF2 feeding speed (second feeding speed)
WF3 feeding speed (third feeding speed)
1 input power supply
2 primary rectifier
3 switching element
4 transformer
5 secondary rectifier
6 reactor
7 output controller
8 welding voltage detector
9 welding current detector
10 short-circuit/arc detector
11 short-circuit controller
12 arc controller
13 pulse waveform controller
14 pulse-rising controller
15 peak-current controller
16 pulse-falling controller
17 wire-feeding controller
18 welding power supply device
19 robot controller
20 welding condition setting unit
21 robot
22 welding wire storage unit
23 welding wire
24 object
25 wire feeder
26 torch
27 chip
28 arc
29a output terminal
29b output terminal
30 molten droplet removal detector

The invention claimed is:
1. A method for controlling pulse arc welding, the method comprising:
providing a pulse arc welding device that welds an object with a welding wire;
controlling the pulse arc welding device so as to weld the object by generating an arc between the welding wire and the object by causing a welding current to flow through the welding wire while feeding the welding wire to the object at a feeding speed such that the welding current alternately repeats a peak current period in which the welding current is a peak current and a base current period in which the welding current is a base current smaller than the peak current; and
controlling the feeding speed so as to keep an arc length of the arc constant,
wherein the controlling of the feeding speed comprises:
setting the feeding speed to a first feeding speed in the base current period;
setting the feeding speed to a second feeding speed in the peak current period, the second feeding speed being larger than the first feeding speed and corresponding to the first feeding speed;
starting to increase the feeding speed from the first feeding speed toward the second feeding speed simultaneously when the welding current starts to rise from the base current toward the peak current while transferring from the base current period to the peak current period in a pulse-rising period;
starting to decrease the feeding speed from the second feeding speed toward the first feeding speed simultaneously when the welding current starts to fall from the peak current toward the base current while transferring from the peak current period to the base current period in a pulse-falling period; and
ramping the welding current in the pulse-rising period and in the pulse-falling period.

2. The method of claim 1, wherein the second feeding speed is larger than the first feeding speed by a value corresponding to at least one of a diameter of the welding wire and a material of the welding wire.

3. The method of claim 1,
wherein the controlling of the pulse arc welding device comprises controlling the pulse arc welding device so as to weld the object using a shielding gas by generating the arc between the welding wire and the object by causing the welding current to flow through the welding wire while feeding the welding wire to the object at the feeding speed such that the welding current alternately repeats the peak current period and the base current period, and
wherein the second feeding speed is larger than the first feeding speed by a value corresponding to at least one of the shielding gas, a diameter of the welding wire, and a material of the welding wire.

4. The method of claim 1, wherein the controlling of the feeding speed further comprises controlling the feeding speed such that a period in which the feeding speed reaches the second feeding speed from the first feeding speed is identical to a period in which the welding current reaches the peak current from the base current.

5. The method of claim 1, wherein the controlling of the feeding speed further comprises controlling the feeding speed such that a period in which the feeding speed reaches the first feeding speed from the second feeding speed is identical to a period in which the welding current reaches the base current from the peak current.

6. The method of claim 1,
wherein the controlling of the pulse arc welding device comprises controlling the pulse arc welding device such that a molten droplet is generated by melting the welding wire by flowing the welding current through the welding wire to generate a constriction between the welding wire and the molten droplet while the molten droplet is connected to the welding wire, wherein the controlling of the feeding speed further comprises:

decreasing the feeding speed from the second feeding speed to a third feeding speed that is smaller than the first feeding speed and corresponds to the first feeding speed while transferring from the peak current period to the base current period; and increasing the feeding speed from the third feeding speed toward the first feeding speed when detecting the generated constriction, and wherein each of the first feeding speed, the second feeding speed, and the third feeding speed is a speed at which the welding wire is fed toward the object.

7. The method of claim 6, wherein the controlling of the feeding speed further comprises maintaining the feeding speed at the first feeding speed until the base current period ends after increasing the feeding speed to the first feeding speed during the increasing of the feeding speed from the third feeding speed toward the first feeding speed.

8. The method of claim 6, wherein the third feeding speed is smaller than the first feeding speed by a value corresponding to at least one of a material of the welding wire and a shielding gas.

9. The method of claim 1, wherein the second feeding speed is larger than the first feeding speed by a value ranging from 10% to 30% of the first feeding speed.

10. A method for controlling pulse arc welding, the method comprising:

providing a pulse arc welding device that welds an object with a welding wire;

controlling the pulse arc welding device so as to weld the object by generating an arc between the welding wire and the object by causing a welding current to flow through the welding wire while feeding the welding wire to the object at a feeding speed such that the welding current alternately repeats a peak current period in which the welding current is a peak current and a base current period in which the welding current is a base current smaller than the peak current; and controlling the feeding speed so as to keep an arc length of the arc constant, wherein the controlling of the pulse arc welding device comprises controlling the pulse arc welding device such that a molten droplet is generated by melting the welding wire by flowing the welding current through the welding wire to generate a constriction between the welding wire and the molten droplet while the molten droplet is connected to the welding wire, wherein the controlling of the feeding speed comprises:

setting the feeding speed to a first feeding speed in the base current period; and setting the feeding speed to a second feeding speed in the peak current period, the second feeding speed being larger than the first feeding speed and corresponding to the first feeding speed;

decreasing the feeding speed from the second feeding speed to a third feeding speed that is smaller than the first feeding speed and corresponds to the first feeding speed while transferring from the peak current period to the base current period; and increasing the feeding speed from the third feeding speed toward the first feeding speed when detecting the generated constriction, and wherein each of the first feeding speed, the second feeding speed, and the third feeding speed is a speed at which the welding wire is fed toward the object.

\* \* \* \* \*